Patented May 8, 1934

1,958,370

UNITED STATES PATENT OFFICE 1,958,370

N-CHLORO COMPOUND AND ITS USE IN STERILIZATION

Franz C. Schmelkes, Bloomfield, N. J., assignor to Wallace & Tiernan Products, Inc., Belleville, N. J., a corporation of New Jersey No Drawing. Application August 7, 1933,
Serial No. 684,121

17 Claims. (Cl. 167—17)

This invention relates to certain new N-chloro compounds, and to the use of these compounds and other N-chloro compounds as sterilizing agents.

This application is a continuation in part of application Serial No. 632,194, filed September 8, 1932.

One of the principal objects of the present invention is to provide sterilizing agents which will act effectively in the presence of organic matter, that is, in liquids of which it may be said that they have an abnormally high chlorine demand.

Other objects of the invention are to provide sterilizing agents which are stable under all ordinary conditions of temperature and moisture and which may be readily manufactured, shipped and will keep for long periods in substantially pure concentrated form.

I have found that certain chlorine derivatives possess the above mentioned desirable characteristics. These are the N-chloro derivatives of oxidants of "redox" systems. The best known example of a redox system is the pair hydroquinone-quinone. In such a pair the oxidized member (quinone) is termed the oxidant, and the reduced member (hydroquinone) the reductant. A redox system is a reduction-oxidation system which is thermodynamically reversible. In other words, the term redox system is reserved for such reduction-oxidation systems in which the reduction of the oxidant yields the same energy as is expended upon the oxidation of the reductant. If in such a system a definite amount of oxidant is reduced to the reductant and the reductant then reoxidized to the oxidant, the change in free energy is zero. Another important characteristic of a redox system is that a definite electrode potential can be measured in solutions containing redox systems if an indifferent electrode is immersed in such solutions. This potential is dependent upon the ratio of the concentrations of the constituents only and not upon their absolute concentration. In other words, the potential which can be measured in a solution which contains .1 mol. fraction of reductant and .9 mol. fractions of oxidant is the same regardless of what the molar concentration is. There are some exceptions to this rule in such cases where, in the reduction or oxidation, a change in the total number of molecules in the solution occurs.

Naturally, this potential is independent of whether the mixture of oxidant and reductant is arrived at by adding a definite amount of reducing agent to a definite amount of oxidant or the corresponding amount of oxidizing agent to the corresponding amount of reductant.

Oxidants of redox systems may and do have widely different structures; for example, some have an azo group and others a quinoid group. There is, so far as I know at present, no way of determining by structure alone whether a compound belongs or does not belong to a redox system.

Further, mere ability to be alternately oxidized and reduced does not signify that the substances possessing that ability necessarily belong to redox systems.

While no hard and fast rule can be laid down for determining whether or not a given substance belongs to a redox system, beyond testing it to see whether it can be reversibly oxidized and reduced as above described, I have found that all the N-chloro derivatives of substances belonging to redox systems which I have been able to test act highly effectively in liquids having an abnormally high chlorine demand.

N-chloro derivatives of the oxidants of redox systems are in general distinguishable from other types of chlorine disinfecting compounds by the fact that they do not liberate iodine from neutral potassium iodide solutions. This test requires that the substances tested be pure, or otherwise iodine may be liberated by the impurities present. Further, while all the N-chloro derivatives of oxidants of redox systems which I have tested with potassium iodide showed no liberation of iodine, there may be such derivatives which will liberate iodine, and, if so, they are not from such fact alone to be regarded as outside the scope of this invention.

Although a redox system comprises a reductant and oxidant pair, the chlorine derivatives are of the oxidant only, since chlorine is such a strong oxidizing agent that, if the reductant is treated with chlorine, it is oxidized to the oxidant before any chlorine enters the compound to produce the chlorine derivative. Hence, one characteristic of my compounds is that they may be prepared from one or other of two substances differing in degree of oxidation from each other. Conversely, my compounds are characterized by the fact that they may again be reduced to one or other of the two substances mentioned above. All N-chloro derivatives which do not possess the above mentioned characteristics are outside of the scope of my invention. Hence, whether the initial material is the reductant or oxidant, the final product may be regarded as a derivative of the oxidant.

The N-chloro derivatives of redox oxidants are remarkable for their stability; they do not decompose spontaneously like hypochlorites and many other chlorine derivatives, and hence do not have any chlorinous odor. The stability of the N-chloro derivatives of redox oxidants may be due to the fact that the basic compound (the unchlorinated oxidant) is an oxidizing agent in itself. In any case, the N-chloro group in these derivatives is dissociated to a much lesser extent than in other N-chloro compounds, as evidenced by the reluctance of these compounds to give a free chlorine test with neutral potassium iodide and also by the absence of chlorinous odor. The probability, therefore, of interaction between dissociated chlorine and acceptors thereof, be they within or without the molecule, is considerably reduced. This is further emphasized by the fact that carbon-hydrogen dissociation in quinone, for instance, (which would provide an intra-molecular acceptor for dissociated chlorine), is probably very much lower than the carbon-hydrogen dissociation in N-chloro acetanilide, for instance, where the change from the N-chloro to the C-chloro structure of the molecule may assume explosive violence.

In spite of this unusual stability of the N-chloro derivatives of redox oxidants against common chemical acceptors for chlorine, they are efficient as bactericides to a very surprising extent in view of their comparative inertness in other respects. Hence, while chlorine, or such chlorine derivatives as hypochlorites, may be said to act on non-living organic matter and bacteria with about equal facility, the N-chloro derivatives of oxidants of redox systems have, as it may be said, a highly selective action on bacteria, destroying the latter while acting less strongly on non-living organic matter.

This selective action is possessed by N-chloro derivatives of redox oxidants to a much greater extent than by N-chloro derivatives of other types which are themselves more selective than chlorine or hypochlorites. For instance, it requires about 125 ppm. of available chlorine as N-chloro-succinimide in a liquid containing 12½% normal milk solids to show residual chlorine after 24 hours contact, and only a very slight amount of residual chlorine can be found in the liquid at the end of such period. With certain N-chloro derivatives of redox oxidants, a strong residual can be obtained in the same liquid after 24 hours with less than 20 ppm. of available chlorine.

Another advantageous property of these N-chloro derivatives of redox oxidants resulting from their general stability is that they have physical and chemical properties which enable them to be readily manufactured, shipped and stored in substantially pure form and without the employment of specially constructed containers. The N-chloro compounds forming the subject matter of the present invention are, therefore, admirably adapted for commercial sale and distribution. They are stable under ordinary atmospheric conditions, except where both light and moisture are present, and not in the least explosive. Further, being solids, they are easily handled and shipped.

Of the N-chloro derivatives of redox oxidants which I have examined, the most efficient are the substances which may be generically termed N-chloro azo-dicarbonamidines. Such derivatives comprise homologues of the simple N-chloro azo-dicarbonamidine compounds.

From the formulæ of the materials from which said azo products are made, the chemical analyses of said products, and their chemical properties, the generic graphic formula of such products appears to be that given below:

$$RN=C-N=N-C=NR$$
$$\quad\ \ |\qquad\quad\ |$$
$$\quad\ \ NR_3\quad\ NR_4$$

In this formula one or more R's represents a chlorine atom. The other R's usually represent hydrogen or a radical such as —CH₃.

Of the above general class of N-chloro azo compounds, the most suitable appears to be N-dichloro azo-dicarbonamidine, more properly termed NN'-dichloro azo-dicarbonamidine. For simplicity the shorter term is used in this specification and claims for this and other similar compounds.

N-dichloro azo-dicarbonamidine forms needle-like yellow crystals. This compound colors water in which it is dissolved strongly yellow, even though the actual amount of the compound in a saturated water solution is not more than about 200 parts in a million at 0° C. This color is still very marked at much lower concentrations.

The intense yellow color of solutions of N-dichloro-azo-dicarbonamidine disappears as the available chlorine thereof is consumed. It is possible, therefore, to determine by the color or tint of the liquid containing such compound whether there is sufficient present to have effective bactericidal action.

This N-dichloro azo compound is soluble in alcohol, acetone, ether and benzol, but insoluble in carbon tetrachloride and chloroform. On heating, it decomposes at around 150° C., without previously melting.

Another group of highly efficient and satisfactory N-chloro derivatives of redox oxidants has a basic quinoid structure. The derivatives of this quinoid type, which have been tested and found to have good bactericidal action in liquids having a high chlorine demand, include the following:

*Ortho-quinoid compounds*

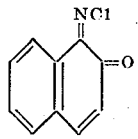

N-monochloro-naphthoquinone-imide (1,2)

*Para-quinoid compounds*

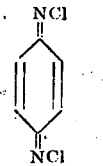

N-dichloro-quinone-diimide (1,4)

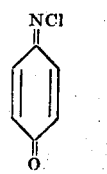

N-monochloro-quinone-imide (1,4)

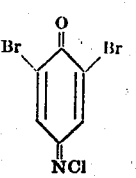

N-monochloro-2,6 dibrom-quinone-imide

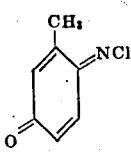

N-monochloro-3 methyl-quinone-imide-4

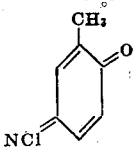

N-monochloro-2 methyl-quinone-imide-4

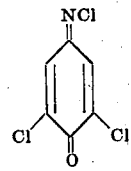

N-monochloro-2, 6 dichlor-quinone-imide

In each of the above quinoid structure compounds, the chlorine is attached to the amino group which originally participated in the oxidation-reduction mechanism, as will be clear from the following example:

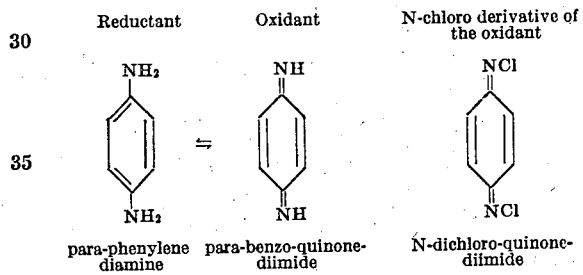

| Reductant | Oxidant | N-chloro derivative of the oxidant |
| --- | --- | --- |
| para-phenylene diamine | para-benzo-quinone-diimide | N-dichloro-quinone-diimide |

The oxidants of a number of theoretically possible redox systems are not sufficiently stable to permit their preparation and also the preparation of N-chloro derivatives, even by treatment of the reductants with chlorine. Where the oxidant is sufficiently stable to permit of its formation, an N-chloro derivative can be formed which has a far higher stability than the oxidant from which it was formed. I have found that this holds true of all the compounds I have prepared, namely that the N-chloro derivative is much more stable than the unchlorinated oxidant. It follows, therefore, that the greater difficulty in preparing N-chloro derivatives of ortho-quinoid systems than of paraquinoid systems is due to the far greater instability of the oxidants of the former as compared with those of the latter.

It will be seen that the N-chloro derivatives of oxidants may be of either aliphatic or aromatic redox systems. Besides being derivatives of oxidants in redox systems, they have in common the fact that they posses a system of conjugated double bonds, wherein one or two N-chloro groups form the beginning or end or both of the system. No other N-chloro group is contained in the molecule of above mentioned compounds, and it is my belief (and all of the substances I have made substantiate this) that as long as no other such group is contained in the molecule the above mentioned characteristics of stability, absence of chlorinous odor, failure to liberate iodine from neutral potassium iodide and bactericidal efficiency in liquids of high chlorine demand are realized.

Of the above mentioned N-chloro derivatives of oxidants, N-dichloro-azo-dicarbonamidine and N-dichloro-quinone-diimide (1, 4) are especially advantageous in that they contain a much higher proportion of available chlorine than such solid sterilizing agents as chloramine-T, di-chloramine-T and N-chloro-succinimide. Thus, N-dichloro-azo-dicarbonamidine and N-dichloro-quinone-diimide (1, 4) contain, respectively, 38.8 and 40.5% of chlorine, as compared with 17.3, 29.6 and 26.6% for chloramine-T, di-chloramine-T, and N-chloro-succinimide, respectively.

I have found that ordinarily a concentration of N-dichloro-azo-dicarbonamidine of between 25 and 250 parts per million of aqueous liquid is sufficient to destroy all bacteria present in the water or on objects immersed therein in less than five minutes, even though the liquid is highly charged with organic material, as in the case of milk or serum.

When the N-dichloro azo compound is used as a preservative, where rapidity of bacterial destruction is not a factor, even lower concentrations are effective.

In determining the concentrations of other N-chloro derivatives of redox oxidants required to give satisfactory results, due regard should be given to the variations in available chlorine in the different derivatives and in the rate at which stoichiometrically equivalent amounts of such derivatives produce sterilization.

The solubility in water of the substances coming within the scope of this invention varies widely. Some of them, for example N-dichloro-quinone-diimide (1, 4), is only soluble in water to the extent of about 23 parts in a million at ordinary temperatures. On the other hand, N-dichloro-azo-dicarbonamidine is soluble to the extent of about 260 parts in a million at 20° C.

Where the solubility of the compound in water permits, it is most conveniently used in the form of an aqueous solution. An organic solvent, such as alcohol, may also be used, especially where the compounds are sparingly soluble in water. For preparing sterilizing solutions for use in dairies, soda fountains, etc., to sterilize utensils, containers and surfaces, all that is necessary in the case of substances readily soluble in water is to allow water to percolate slowly through a bed of the compound, and then, if desired, dilute the saturated solution so obtained. Where the solutions are not used promptly, they should be protected from the chemically active light rays by keeping such solutions in black or brown bottles.

Where substances are used which are not sufficiently soluble to enable them to be used effectively in solution form, they may be used in the form of an emulsion or suspension. The more soluble substances may also be used in the same way, if desired, especially in the preparation of aqueous mixtures to be subsequently diluted to proper strength. The term "suspension" is used to indicate a mixture of solid particles of the N-chloro compound and a suitable liquid without a protective colloid or other agent adapted to prevent adherence of such particles. The term "emulsion" is used to indicate such a mixture containing a protective colloid or other similar agent.

When the substances used are difficultly soluble, their action may be slow since the rate of action will depend on the quantity of the substance in solution at any one time. When a suspension or emulsion of such substances is used, as fast as the substance is converted into other products, more of the original substance in solution will dissolve, but the amount in solution at any one time cannot be in excess of the solubility of such substance.

The N-chloro derivatives of the oxidant in a redox system may be used not only alone but also in admixture with other substances which may or may not be sterilizing agents; and the claims to a sterilizing agent are not to be construed as limited to the substances alone.

Some of these N-chloro derivatives of redox oxidants, such as the N-chloro azo-dicarbonamidines, may also be used as an antiseptic dressing for the skin, cuts or mucous tissue, as they are not irritating to the human tissues and are almost tasteless and odorless. Some of the compounds in question, such as the N-chloro azo-dicarbonamidines, are hemolytic only to a very slight degree and therefore adapted to be injected into the blood stream.

These derivatives are destructive to molds and the like, as well as to bacteria. They are therefore suitable for the treatment of fruit, grass, and all other vegetable materials requiring destruction or arrest of growth of micro-organisms during any stage of development or storage.

For the purposes of this patent application, no distinction is being made between a fungicide, a germicide, a bactericide, an antiseptic, a disinfectant, a preservative, a prophylactic and a sterilizing agent, and the expression "sterilizing agent", where it is used, is meant to comprise the above list of terms.

Further, the term "sterilization" is used in its practical sense to include sterilization to a degree satisfactory for the purpose for which the reagent is employed, and is not to be confined to sterilization in the strict scientific sense of absolute destruction of all forms of life, dormant or otherwise. The degree of sterilization effected depends largely on the strength of the sterilizing solutions used.

N-chloro derivatives of azo-dicarbonamidine do not attack brass or copper, as do solutions of chlorine, chloramines or nitrogen trichloride. Iron and aluminum are attacked, however, by such derivatives. Such attack can, however, be substantially, if not completely, eliminated without substantial loss of sterilizing power by the addition to such sterilizing agent of trisodium phosphate, $Na_3PO_4$; disodium phosphate, $Na_2HPO_4$; or sodium silicate, $Na_2SiO_3$; or generally salt mixtures containing phosphates or silicates. The proportion of phosphate or silicate added should be sufficient to reduce the percentage of available chlorine in the dry mixture not more than about 5%. For example, using N-dichloro-azo-dicarbonamidine which contains about 39% of available chlorine, the proportion of phosphate or silicate to such N-dichloro compound should be at least 7 : 1.

So far as N-chloro-azo-dicarbonamidines are concerned, I believe that I am the first, not merely to discover their beneficial properties as above described, but also to discover the compounds themselves. Such compounds and the processes for making them are claimed in my copending application Serial No. 632,193, filed September 8, 1932. A method for making N-dichloro-azo-dicarbonamidine substantially quantitatively comprises mixing a 10 to 20% solution of hydrazo-dicarbonamidine hydrochloride with a neutral solution of sodium hypochlorite and filtering off the precipitated N-dichloro-azo-dicarbonamidine. The temperature of the solutions during reaction should be between 0° and 5° C. The reacting materials should be used in the proportions called for by the following equation:

$$C_2N_6H_8 \cdot 2HCl + 3NaOCl = C_2N_6H_4Cl_2 + 3H_2O + 3NaCl$$

What is claimed is:

1. As a sterilizing agent, a solution of an N-chloro derivative of the oxidant in a redox system.

2. As a sterilizing agent, an N-chloro aliphatic compound having a selective action for bacteria in the presence of oxidizable organic matter and sufficiently stable so as not to possess any chlorinous odor.

3. As a sterilizing agent, a solution of an N-chloro derivative of an oxidant in a redox system wherein all the oxidizing chlorine is bound to nitrogen atoms constituting part of a conjugated system of double bonds.

4. As a sterilizing agent, an N-chloro derivative of an oxidant in an aliphatic redox system.

5. As a sterilizing agent, an N-chloro-azo-dicarbonamidine.

6. As a sterilizing agent, N-dichloro-azo-dicarbonamidine.

7. As a sterilizing agent, a solution of an N-chloro derivative of an oxidant in an aromatic redox system.

8. As a sterilizing agent, a solution of an N-chloro derivative of the oxidant in a redox system wherein the chlorine is attached to the amino group which originally participated in the oxidation-reduction mechanism.

9. As a sterilizing agent, a solution of an N-chloro derivative of the oxidant in a redox system of para-quinoid structure.

10. As a sterilizing agent, a solution of N-dichloro-quinone-diimide (1, 4).

11. As a sterilizing agent, a solution of an N-chloro derivative of the oxidant in a redox system of ortho-quinoid structure.

12. As a sterilizing agent, a solution of N-monochloro-naphthoquinoneimide (1, 2).

13. An N-chloro-azo-dicarbonamidine.

14. N-dichloro-azo-dicarbonamidine.

15. A compound consisting of carbon, nitrogen, hydrogen and chlorine in the ratio of two atoms of carbon to six of nitrogen and six of hydrogen and chlorine taken together.

16. A compound having the formula

with at least two hydrogens replaced by chlorine.

17. The organic product of the reaction between hydrazo-dicarbonamidine hydrochloride and a cold neutral solution of sodium hypochlorite.

FRANZ C. SCHMELKES.